(12) United States Patent
Jeong

(10) Patent No.: US 12,715,262 B2
(45) Date of Patent: Aug. 25, 2026

(54) REFRIGERANT VALVE MODULE FOR A VEHICLE

(71) Applicants: HYUNDAI MOTOR COMPANY, Seoul (KR); KIA CORPORATION, Seoul (KR)

(72) Inventor: Seong-Bin Jeong, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 106 days.

(21) Appl. No.: 18/624,755

(22) Filed: Apr. 2, 2024

(65) Prior Publication Data

US 2025/0083490 A1 Mar. 13, 2025

(30) Foreign Application Priority Data

Sep. 11, 2023 (KR) ........................ 10-2023-0120237

(51) Int. Cl.
*B60H 1/00* (2006.01)

(52) U.S. Cl.
CPC ................................ *B60H 1/00485* (2013.01)

(58) Field of Classification Search
CPC . B60H 1/00485; B60H 1/3229; F16K 27/003; F16K 27/067; F16K 11/20; F16K 5/0636
See application file for complete search history.

(56) References Cited

U.S. PATENT DOCUMENTS 5,129,417 A * 7/1992 Dupont ................. F16K 27/067 137/454.6
5,558,124 A * 9/1996 Randall ............... G01L 19/0015 73/756
8,844,567 B2 * 9/2014 Lockhart ................ F25B 41/40 137/551
9,157,643 B2 * 10/2015 Cimberio ................ F24F 3/052
2021/0053415 A1 * 2/2021 Oh ....................... B60H 1/3229
2022/0268364 A1 * 8/2022 Geng .................... F16K 31/535
2024/0025226 A1 * 1/2024 Jin .......................... F25B 41/20
2024/0157759 A1 * 5/2024 Jiang .................. B60H 1/00885
2025/0035350 A1 * 1/2025 Jeong ...................... F25B 41/20
2025/0242666 A1 * 7/2025 Lee ...................... B60H 1/3227

* cited by examiner

*Primary Examiner* — Reinaldo Sanchez-Medina
*Assistant Examiner* — Nicole Gardner
(74) *Attorney, Agent, or Firm* — Lempia Summerfield Katz LLC

(57) ABSTRACT

A refrigerant valve module for a vehicle may include a valve manifold interiorly forming a refrigerant fluid line so as to selectively discharge or bypass a supplied refrigerant, and a plurality of valve assemblies mounted in the valve manifold so as to control flowing of the refrigerant flowing in the refrigerant fluid line.

11 Claims, 11 Drawing Sheets

REFRIGERANT VALVE MODULE FOR A VEHICLE

CROSS-REFERENCE TO RELATED APPLICATION

This application claims priority to and the benefit of Korean Patent Application No. 10-2023-0120237, filed in the Korean Intellectual Property Office on Sep. 11, 2023, the entire contents of which is incorporated herein by reference.

BACKGROUND

(a) Field

The present disclosure relates to a refrigerant valve module for a vehicle. More particularly, the present disclosure relates to a refrigerant valve module for a vehicle capable of integrally forming a plurality of valve assemblies and valve manifold.

(b) Description of the Related Art

Generally, an air conditioning system for a vehicle includes an air conditioner unit circulating a refrigerant in order to heat or cool an interior of the vehicle.

The air conditioner unit is used to maintain the interior of the vehicle at an appropriate temperature regardless of a change in an external temperature to maintain a comfortable interior environment. In particular, the air conditioner unit is configured to heat or cool the interior of the vehicle circulating refrigerant discharged from a compressor, while exchanging heat between a condenser and an evaporator. In this process, the refrigerant discharged by driving of the compressor passes through the condenser, a receiver drier, an expansion valve, and the evaporator, the refrigerant is circulated back to the compressor.

In other words, the air conditioner unit lowers a temperature and a humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Given the ongoing rise in interest regarding energy efficiency and environmental pollution concerns, the development of an environmentally-friendly vehicle capable of substantially substituting for an internal combustion engine vehicle is desired. The environmentally-friendly vehicle is classified into an electric vehicle driven using a fuel cell or electricity as a power source and a hybrid vehicle driven using an engine and a battery.

In the electric vehicle or the hybrid vehicle among these environmentally-friendly vehicles, a separate heater is not used unlike an air conditioner of a general vehicle, and an air conditioner used in the environmentally-friendly vehicle is generally called a heat pump system.

The electric vehicle driven by a power source of a fuel cell generates driving force by converting chemical reaction energy between oxygen and hydrogen into electrical energy. In this process, heat energy is generated by a chemical reaction in the fuel cell. Therefore, it is desired to effectively remove the generated heat energy to secure the performance of the fuel cell.

In addition, in a hybrid vehicle, a driving force is generated by driving a motor using electricity supplied from the fuel cell or the battery together with an engine that is operated with a general fuel. Therefore, it is desired to effectively remove heat generated from the fuel cell, the battery, and the motor to secure the performance of the motor.

Accordingly, in a hybrid vehicle or an electric vehicle according to the prior art, a cooling device for preventing heat generation in a motor and an electrical component and a battery cooling device for preventing heat generation in a battery including a fuel cell should be configured with separate sealed circuits.

Therefore, there are drawbacks in that a cooling module disposed at the front of the vehicle has an increased size and weight, and the layout of connection pipes for supplying a refrigerant or a coolant to each heat pump system, a cooling device inside an engine room, and a battery cooling device is complicated.

The above information disclosed in this Background section is provided only to enhance understanding of the background of the present disclosure, and therefore it may contain information that does not constitute the prior art.

SUMMARY

The present disclosure provides a refrigerant valve module for a vehicle capable of integrally forming a plurality of valve assemblies and valve manifold so that the refrigerant valve module is simple to assemble with a reduced number of parts, and thus the refrigerant valve module is easily maintained.

In one embodiment of the present disclosure, a refrigerant valve module for a vehicle may include: a valve manifold interiorly forming a refrigerant fluid line so as to selectively discharge or bypass a supplied refrigerant, and a plurality of valve assemblies mounted in the valve manifold so as to control the flow of the refrigerant flowing in the refrigerant fluid line.

In another embodiment of the present disclosure, the valve manifold may include: a first body inside which a first fluid line is formed, and a first mounting groove communicating with the first fluid line. The first mounting groove is formed in the first body to be capable of mounting the valve assembly. The valve manifold further includes: a second body inside which a second fluid line is formed, and a second mounting groove that is configured to communicate with the second fluid line and formed in the second body to be capable of mounting the valve assembly. The valve manifold further includes: a third body inside which a third fluid line is formed, and a third mounting groove that is configured to communicate with the third fluid line and formed in the third body to be capable of mounting the valve assembly. The valve manifold further includes: a first connection portion that interiorly forms a first connection fluid line and is disposed between the first body and the second body to interconnect the first body and the second body. The valve manifold further includes: a second connection portion that interiorly forms a second connection fluid line and is disposed between the first body and the third body to interconnect the first body and the third body.

In another embodiment, the refrigerant fluid line may include: the first body, the second body, the third body, the first connection portion, the first fluid line, the second fluid line, the third fluid line, the first connection fluid line, and the second connection fluid line. In particular, the first fluid line, the second fluid line, the third fluid line, the first connection fluid line, and the second connection fluid line are interconnected to each other (directly or indirectly) inside of the second connection portion.

The valve manifold may further include a plurality of refrigerant holes communicating with the first mounting groove, the second mounting groove or the third mounting groove, and the plurality of refrigerant holes may be formed in the first body, the second body, the third body, the first connection portion, and the second connection portion, respectively, such that refrigerant may be introduced or discharged through the refrigerant holes.

The plurality of refrigerant holes may include: a first refrigerant hole, a second refrigerant hole, a third refrigerant hole, a fourth refrigerant hole, and a fifth refrigerant hole. In particular, the first refrigerant hole is configured to communicate with the first mounting groove through the first fluid line, and horizontally formed toward the second body based on a length direction of the valve manifold. The second refrigerant hole is configured to communicate with the first mounting groove through the first fluid line, and horizontally formed toward the third body based on the length direction of the valve manifold. The third refrigerant hole communicating with the first mounting groove through the first fluid line may be formed perpendicular to the first and the second refrigerant hole in an opposite direction of the first mounting groove. The fourth refrigerant hole communicating with the second mounting groove through the second fluid line may be formed perpendicular to the first refrigerant hole in the second body, and the fifth refrigerant hole formed in the second body to be disposed on the same axis as the fourth refrigerant hole is configured to communicate with the second mounting groove through the second fluid line.

The plurality of refrigerant holes may further include a sixth refrigerant hole communicating with the third mounting groove through the third fluid line, and formed perpendicular to the second refrigerant hole in the third body. The plurality of refrigerant holes may further include a seventh refrigerant hole formed in the third body to be disposed on the same axis as the sixth refrigerant hole, and communicating with the third mounting groove through the third fluid line; and an eighth refrigerant hole communicating with the first connection fluid line, and formed in the same direction as the fourth refrigerant hole in the first connection portion. The plurality of refrigerant holes may further include a ninth refrigerant hole communicating with the second connection fluid line, and formed in the same direction as the sixth refrigerant hole in the second connection portion.

The refrigerant supplied to the valve manifold may be selectively discharged to the third refrigerant hole, the fourth refrigerant hole, the fifth refrigerant hole, the sixth refrigerant hole, or the seventh refrigerant hole.

The refrigerant supplied to the valve manifold selectively flows into the eighth refrigerant hole or the ninth refrigerant hole.

The first body, the second body, the third body, the first connection portion, and the second connection portion may be integrally formed.

The valve assembly may include an actuator configured to generate a torque according to a control signal, and a shaft having a first end coupled to the actuator to receive power from the actuator. The valve assembly may further include a ball coupled to a second end of the shaft, and rotating by the power of the actuator; and a seat housing coupled to the actuator and configured to rotatably accommodate the ball.

A diameter of the seat housing may be gradually reduced from the actuator to the valve manifold.

The ball may include: an inlet passage selectively communicating with the refrigerant fluid line and configured to receive the refrigerant; and an outlet passage communicating with the inlet passage, and configured to discharge the refrigerant introduced into the inlet passage.

A sealing member may be interposed between the valve manifold and the plurality of valve assemblies.

As described above, the refrigerant valve module for the vehicle according to the embodiments of the present disclosure are simple to assemble with a reduced number of parts, and thus the refrigerant valve module is easily maintained, by integrally forming the plurality of valve assemblies using the valve manifold.

In addition, according to the present disclosure, by mounting the plurality of valve assemblies using the valve manifold and including the refrigerant flow path inside, it is possible to prevent a leakage of the refrigerant while minimizing the sealing member, thereby improving overall marketability.

In addition, according to the present disclosure, since the refrigerant flow path formed in the valve manifold is not sharply bent, it is possible to reduce a passage resistance, and it is possible to minimize the use of connecting pipes.

Furthermore, according to the present disclosure, by promoting simplification and modularization of components, it is possible to reduce the manufacturing cost and reduce the weight, and it is possible to improve the space utilization.

DETAILED DESCRIPTION

Figure 1:
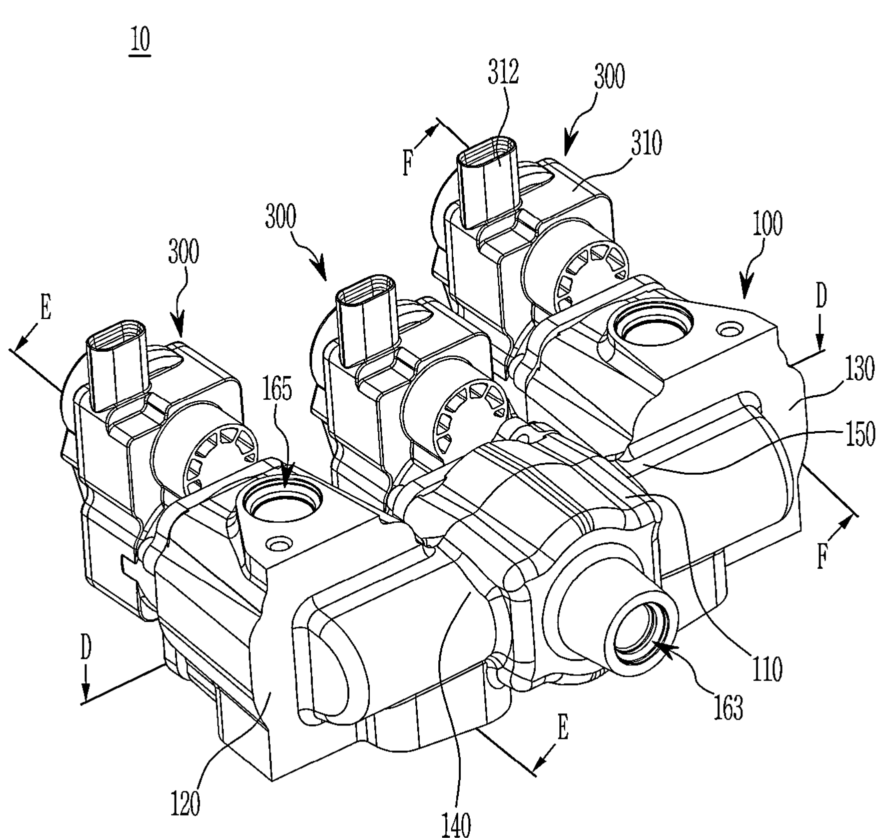
FIG. 1 is a perspective view of a refrigerant valve module for a vehicle according to an embodiment.

Embodiments are hereinafter described in detail with reference to the accompanying drawings.

Embodiments disclosed in the present disclosure and the constructions depicted in the drawings are only exemplary embodiments of the present disclosure, and do not cover the entire scope of the present disclosure. Therefore, it should be understood that there may be various equivalents and variations at the time of the application of the present disclosure.

In order to clarify the present disclosure, parts that are not related to the description are omitted, and the same elements or equivalents are referred to with the same reference numerals throughout the present disclosure.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, unless explicitly described to the contrary, the word "comprise" and variations such as "comprises" or "comprising", will be understood to imply the inclusion of stated elements but not the exclusion of any other elements. When a component, device, element, or the like of the present disclosure is described as having a purpose or performing an operation, function, or the like, the component, device, or element should be considered herein as being "configured to" meet that purpose or to perform that operation or function.

Furthermore, each of terms, such as " . . . unit", " . . . means", " . . . portions", " . . . part", and " . . . member" described in the present disclosure, mean a unit of a comprehensive element that performs at least one function or operation.

Figure 2:
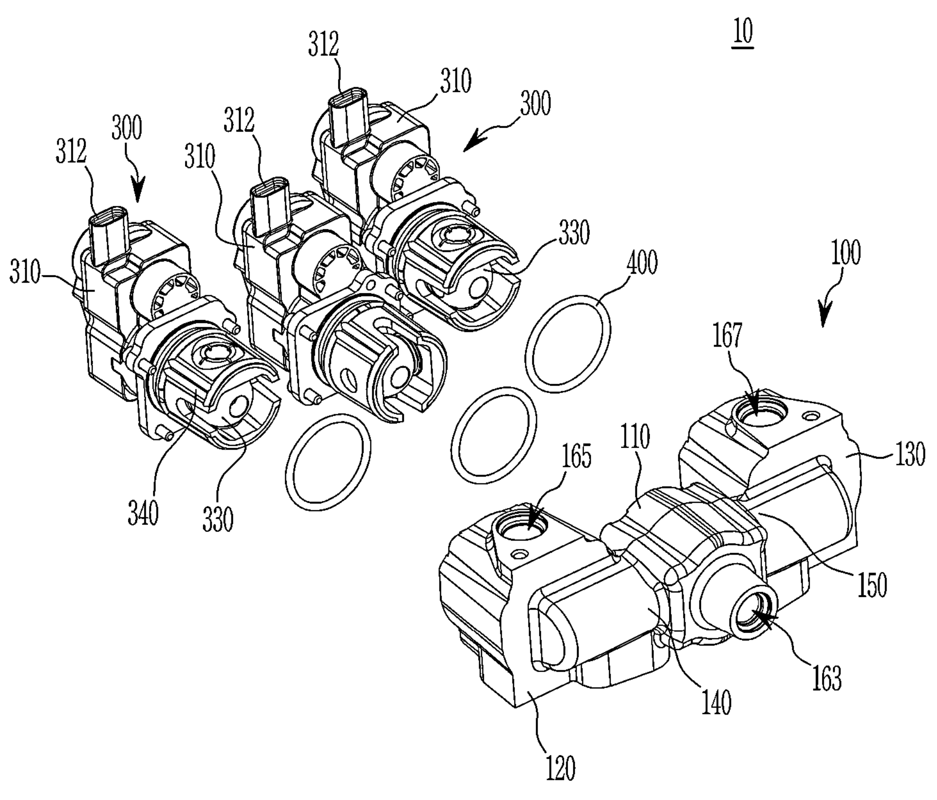
FIG. 2 is an exploded perspective view of a refrigerant valve module for a vehicle according to an embodiment.
Figure 3:
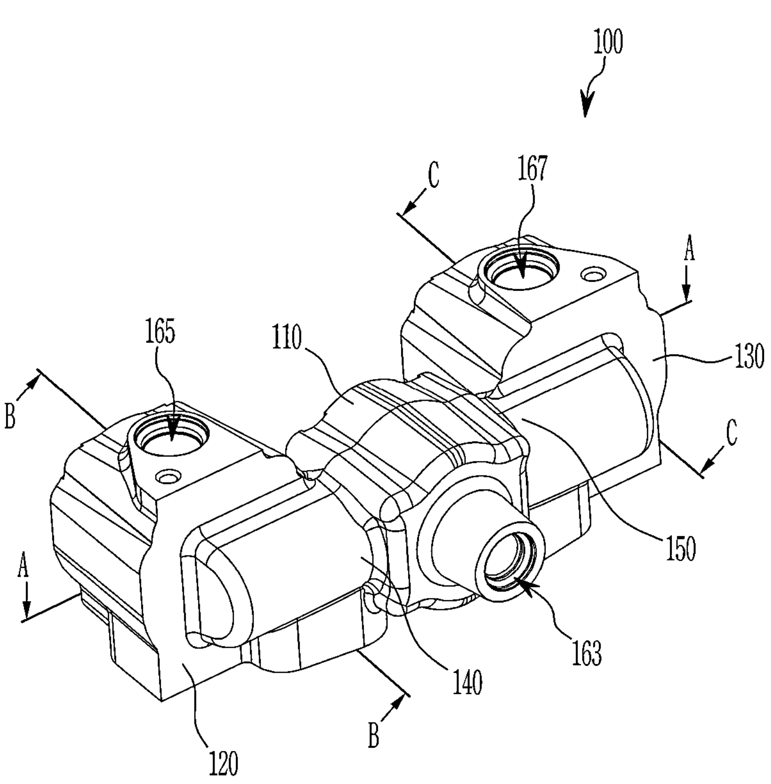
FIG. 3 is a front perspective view of a valve manifold applied to a refrigerant valve module for a vehicle according to an embodiment.
Figure 4:
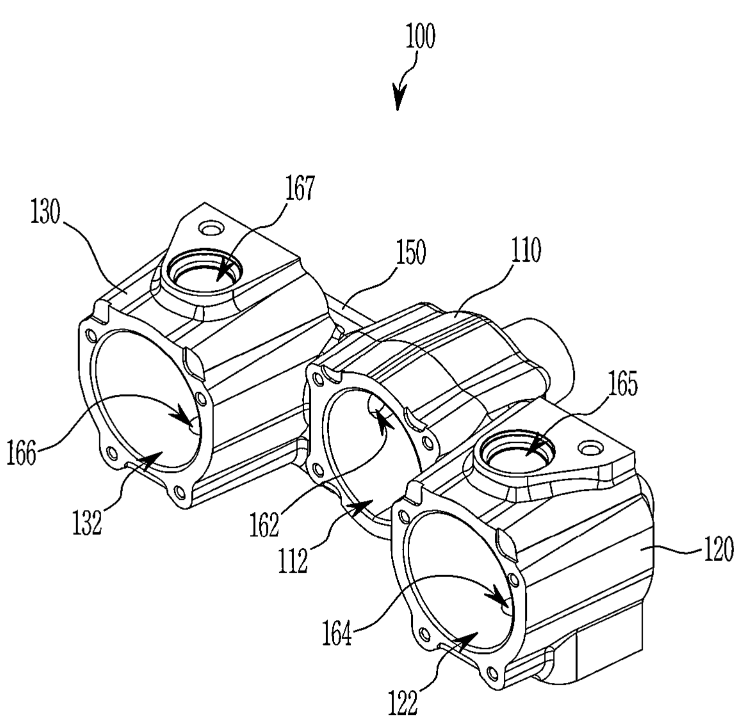
FIG. 4 is a rear perspective view of a valve manifold applied to a refrigerant valve module for a vehicle according to an embodiment.
Figure 5:
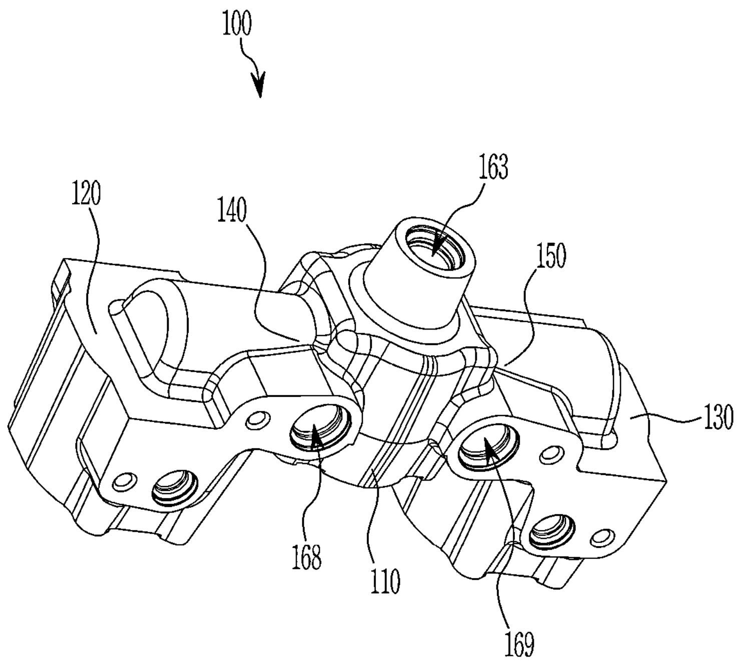
FIG. 5 is a bottom perspective view of a valve manifold applied to a refrigerant valve module for a vehicle according to an embodiment.
Figure 6:
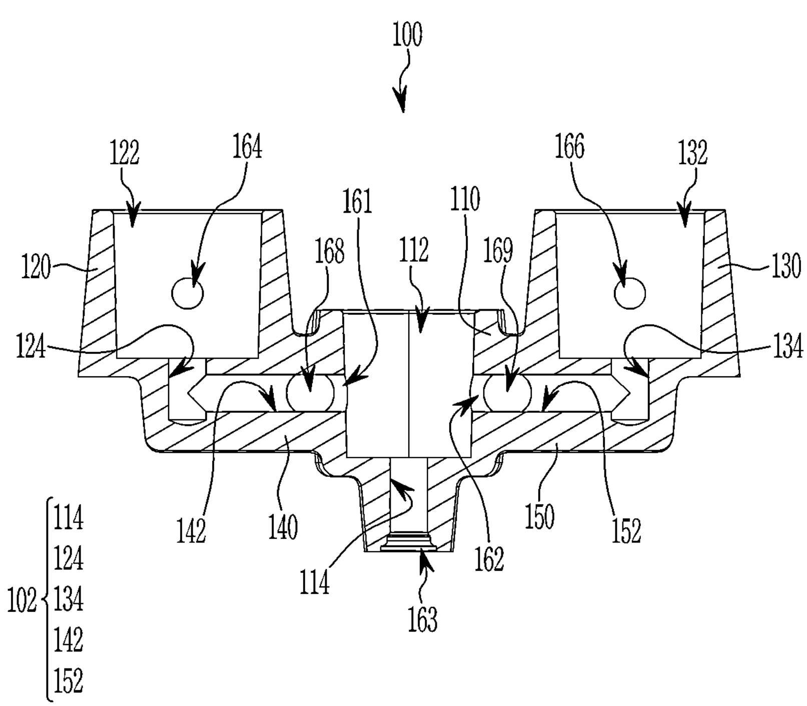
FIG. 6 is a cross-sectional view taken along line A-A of FIG. 3.
Figure 7:
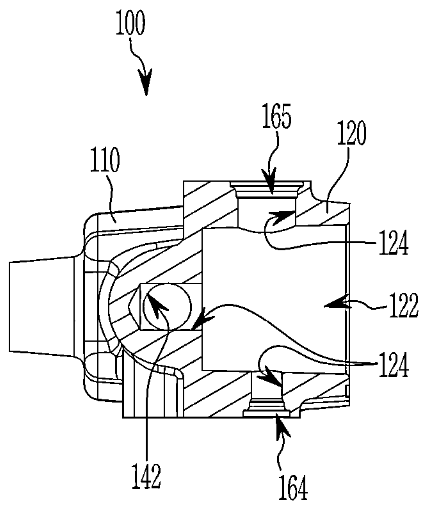
FIG. 7 is a cross-sectional view taken along line B-B of FIG. 3.
Figure 8:
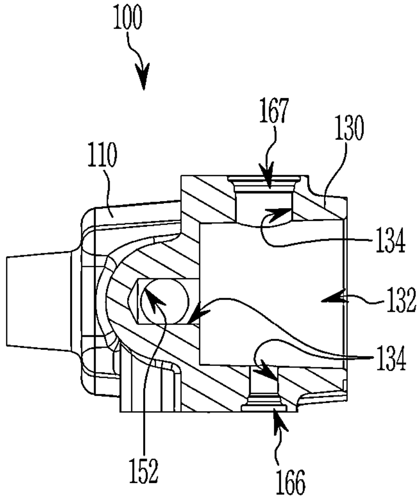
FIG. 8 is a cross-sectional view taken along line C-C of FIG. 3.
Figure 9:
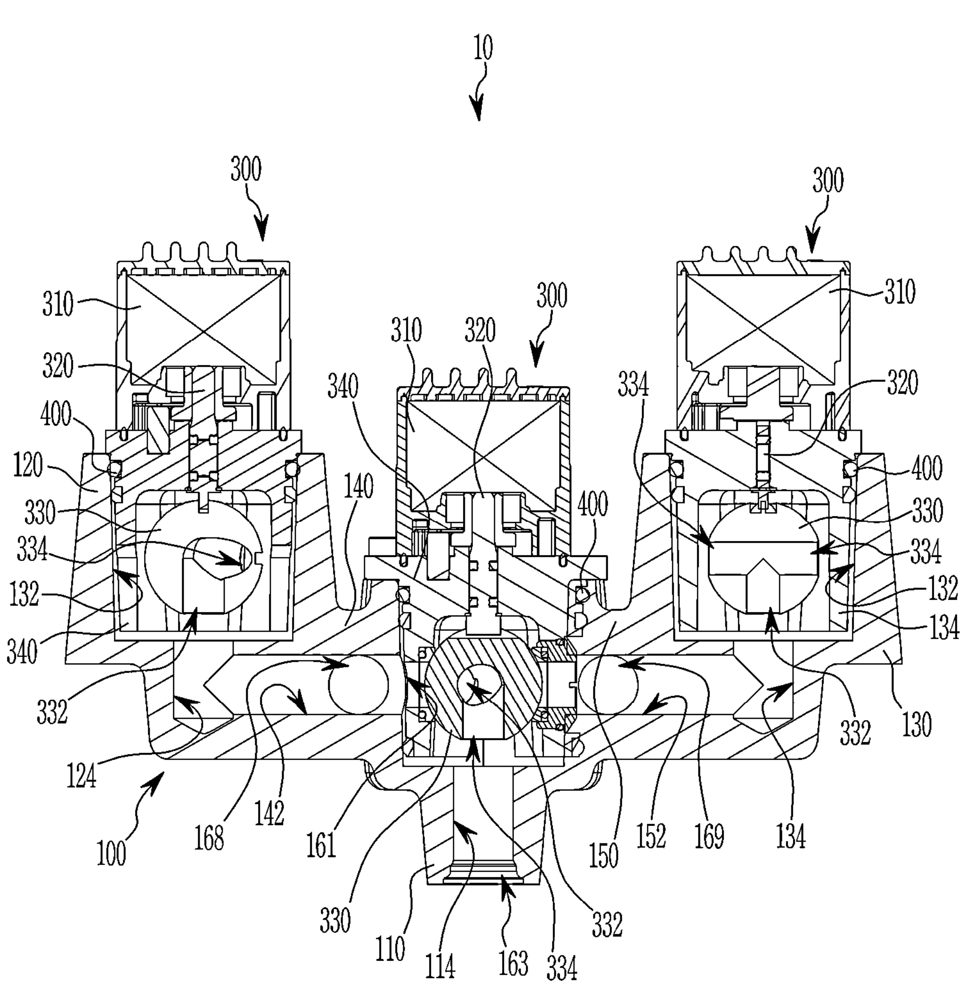
FIG. 9 is a cross-sectional view taken along line D-D of FIG. 1.
Figure 10:
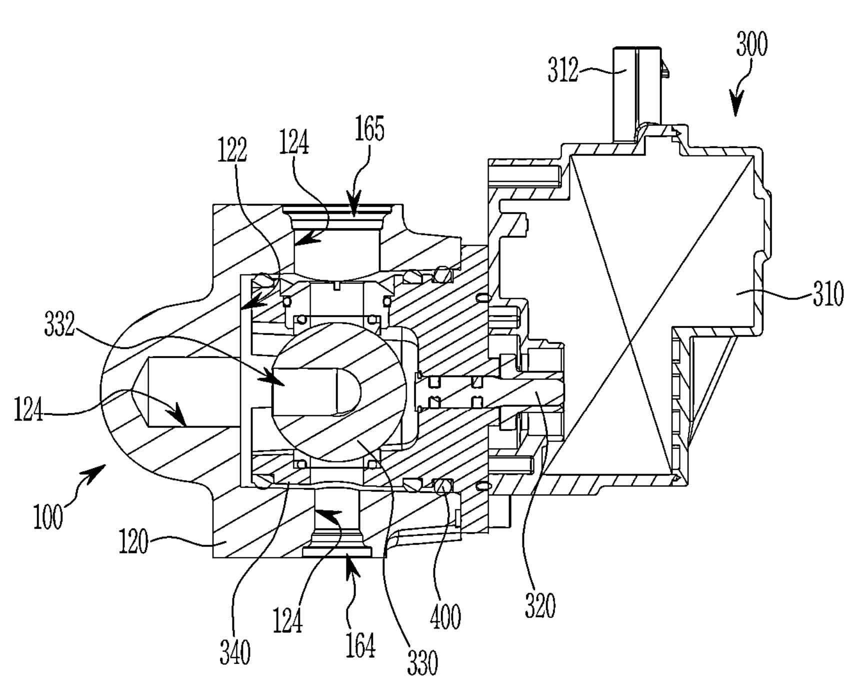
FIG. 10 is a cross-sectional view taken along line E-E of FIG. 1.
Figure 11:
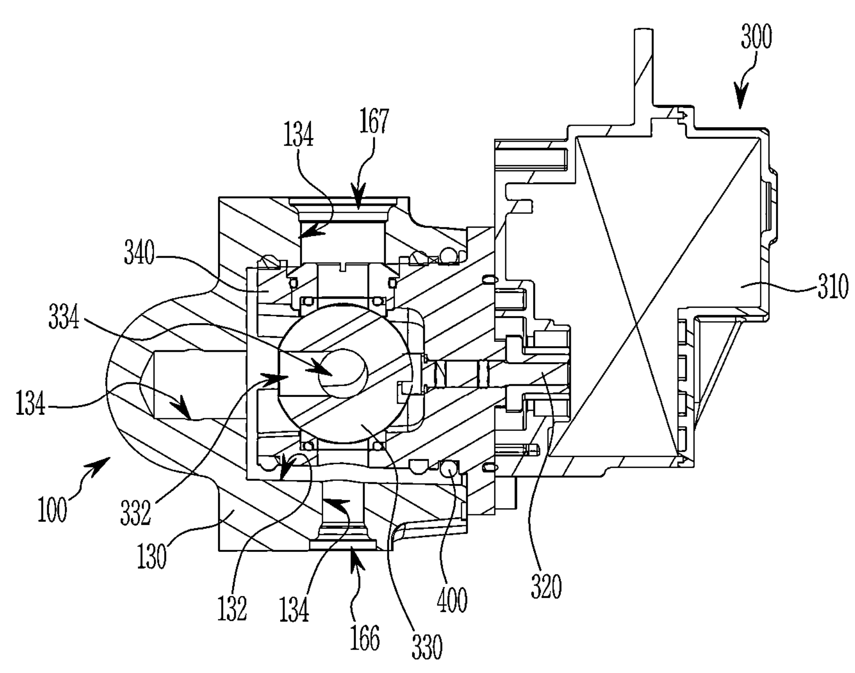
FIG. 11 is a cross-sectional view taken along line F-F of FIG. 1.

FIG. 1 is a perspective view of a refrigerant valve module for a vehicle according to an embodiment. FIG. 2 is an exploded perspective view of the refrigerant valve module for a vehicle according to an embodiment. FIG. 3 is a front perspective view of a valve manifold applied to the refrigerant valve module for a vehicle according to an embodiment. FIG. 4 is a rear perspective view of a valve manifold applied to the refrigerant valve module for a vehicle according to an embodiment. FIG. 5 is a bottom perspective view of a valve manifold applied to the refrigerant valve module for a vehicle according to an embodiment. FIG. 6 is a cross-sectional view taken along line A-A of FIG. 3. FIG. 7 is a cross-sectional view taken along line B-B of FIG. 3. FIG. 8 is a cross-sectional view taken along line C-C of FIG. 3. FIG. 9 is a cross-sectional view taken along line D-D of FIG. 1. FIG. 10 is a cross-sectional view taken along line E-E of FIG. 1. FIG. 11 is a cross-sectional view taken along line F-F of FIG. 1.

Referring to the drawings, a refrigerant valve module 10 for a vehicle according to an embodiment of the present disclosure is simple to assemble with a reduced number of parts, and is easy to maintain, by integrally forming a plurality of valve assemblies 300.

A refrigerant valve module 10 may be mounted on the vehicle body through a bracket (not shown).

As shown in FIG. 1 to FIG. 2, the refrigerant valve module 10 may include a valve manifold 100 and the valve assembly 300. In one embodiment, the valve manifold 100 is formed with a refrigerant fluid line.

As illustrated in FIG. 6, the refrigerant fluid line 102 may be formed in the valve manifold 100. The refrigerant introduced into the refrigerant fluid line 102 is then suppled to a chiller or a heat-exchanger, or alternatively, the refrigerant may bypass the chiller or heat-exchanger.

Here, the chiller or the heat-exchanger is configured to exchange heat between the introduced refrigerant with a coolant that is an operation fluid. The chiller or heat-exchanger may be provided as a plate-type heat-exchanger in which multiple plates are stacked on one another.

In addition, flow paths through which the refrigerant and the coolant flow may be alternately formed inside the heat exchanger. In other words, the heat exchanger may be configured as a water-cooled heat exchanger in which the refrigerant and the coolant exchange heat.

In one embodiment, as shown in FIG. 3 to FIG. 8, the valve manifold 100 may include a first body 110, a first mounting groove 112, a second body 120, a second mounting groove 122, a third body 130, a third mounting groove 132, a first connection portion 140, and a second connection portion 150.

In one form, a first fluid line 114 may be formed inside the first body 110.

The first mounting groove 112 may communicate with the first fluid line 114. The first mounting groove 112 may be formed in the first body 110 such that the valve assembly 300 may be mounted.

In another embodiment, a second fluid line 124 may be formed inside the second body 120.

The second mounting groove 122 may communicate with the second fluid line 124. The second mounting groove 122 may be formed in the second body 120 such that the valve assembly 300 may be mounted.

In one embodiment, a third fluid line 134 may be formed inside the third body 130.

The third mounting groove 132 may communicate with the third fluid line 134. The third mounting groove 132 may be formed in the third body 130 such that the valve assembly 300 may be mounted.

In another embodiment, a first connection fluid line 142 may be formed inside the first connection portion 140.

The first connection portion 140 may be disposed between the first body 110 and the second body 120 to interconnect the first body 110 and the second body 120.

In addition, a second connection fluid line 152 may be formed inside the second connection portion 150. The second connection portion 150 may be disposed between the first body 110 and the third body 130 to interconnect the first body 110 and the third body 130.

In other words, the first body 110 may be centrally disposed, and the second body 120 and the third body 130 may be disposed at both sides of the first body 110 and interconnected through the first connection portion 140 and the second connection portion 150.

Here, the refrigerant fluid line 102 may be formed by the first fluid line 114, the second fluid line 124, the third fluid line 134, the first connection fluid line 142, and the second connection fluid line 152, which are interconnected within the first body 110, the second body 120, the third body 130, the first connection portion 140, and the second connection portion 150, respectively.

The first body 110, the second body 120, the third body 130, the first connection portion 140, and the second connection portion 150 may be integrally formed.

In one form, the valve manifold 100 may be formed of at least one material among a plastic material and a steel material.

The valve manifold 100 may be manufactured by a manufacturing method including injection molding, casting, or the like, depending on the material, such that the first body 110, the second body 120, the third body 130, the first connection portion 140, and the second connection portion 150 may be integrally connected.

In one embodiment, the valve manifold 100 may communicate with the first mounting groove 112, the second mounting groove 122, or the third mounting groove 132. The valve manifold 100 may further include a plurality of refrigerant holes formed in each of the first body 110, the second body 120, the third body 130, the first connection portion 140, and the second connection portion 150 such that the refrigerant may be introduced or discharged through the refrigerant holes.

In one embodiment, the plurality of refrigerant holes may include a first refrigerant hole 161, a second refrigerant hole 162, a third refrigerant hole 163, a fourth refrigerant hole

164, a fifth refrigerant hole 165, a sixth refrigerant hole 166, a seventh refrigerant hole 167, an eighth refrigerant hole 168, and a ninth refrigerant hole 169.

The first refrigerant hole 161 may communicate with the first mounting groove 112 through the first fluid line 114. The first refrigerant hole 161 may be horizontally formed toward the second body 120 based on a length direction of the valve manifold 100.

The second refrigerant hole 162 may communicate with the first mounting groove 112 through the first fluid line 114. The second refrigerant hole 162 may be horizontally formed toward the third body 130 based on the length direction of the valve manifold 100.

In another embodiment, the third refrigerant hole 163 may communicate with the first mounting groove 112 through the first fluid line 114. The third refrigerant hole 163 may be formed perpendicular to the first and second refrigerant holes 161 and 162 in an opposite direction of the first mounting groove 112.

In other words, the first refrigerant hole 161 and the second refrigerant hole 162 may be formed on the same axis along the length direction of the first body 110. In addition, the third refrigerant hole 163 may be formed along a width direction of the first body 110, and may be disposed perpendicular to the first refrigerant hole 161 or the second refrigerant hole 162.

Here, the third refrigerant hole 163 may be connected to a heat-exchanger or a chiller such that the refrigerant may flow into the heat-exchanger or the chiller.

In the present embodiment, the fourth refrigerant hole 164 may communicate with the second mounting groove 122 through the second fluid line 124. The fourth refrigerant hole 164 may be formed perpendicular to the first refrigerant hole 161 in the second body 120.

The fifth refrigerant hole 165 may be formed in the second body 120, to be disposed on the same axis as the fourth refrigerant hole 164. The fifth refrigerant hole 165 may communicate with the second mounting groove 122 through the second fluid line 124.

In other words, the fourth refrigerant hole 164 and the fifth refrigerant hole 165 may be formed along a height direction of the second body 120, respectively.

In the present embodiment, the sixth refrigerant hole 166 may communicate with the third mounting groove 132 through the third fluid line 134. The sixth refrigerant hole 166 may be formed perpendicular to the second refrigerant hole 162 in the third body 130.

The seventh refrigerant hole 167 may be formed in the third body 130 to be disposed on the same axis as the sixth refrigerant hole 166. The seventh refrigerant hole 167 may communicate with the third mounting groove 132 through the third fluid line 134.

In other words, the sixth refrigerant hole 166 and the seventh refrigerant hole 167 may be formed along the height direction of the third body 130, respectively.

In addition, the eighth refrigerant hole 168 may be formed in the same direction as the fourth refrigerant hole 164 in the first connection portion 140. The eighth refrigerant hole 168 may communicate with the first connection fluid line 142.

The ninth refrigerant hole 169 may be formed in the same direction as the sixth refrigerant hole 166 in the second connection portion 150. The ninth refrigerant hole 169 may communicate with the second connection fluid line 152.

Here, the refrigerant supplied to the valve manifold 100 may be selectively discharged to the third refrigerant hole 163, the fourth refrigerant hole 164, the fifth refrigerant hole 165, the sixth refrigerant hole 166, or the seventh refrigerant hole 167.

In addition, the refrigerant supplied to the valve manifold 100 may selectively flow into the eighth refrigerant hole 168 or the ninth refrigerant hole 169.

The refrigerant introduced into the valve manifold 100 through the eighth refrigerant hole 168 or the ninth refrigerant hole 169 may flow along the refrigerant fluid line 102.

The refrigerant flowing through the refrigerant fluid line 102 may be selectively discharged from the valve manifold 100 through the third refrigerant hole 163, the fourth refrigerant hole 164, the fifth refrigerant hole 165, the sixth refrigerant hole 166, or the seventh refrigerant hole 167, according to an operation of the valve assemblies 300.

In addition, the valve assembly 300 may be provided in a plural quantity. The valve assembly 300 may be mounted on the valve manifold 100 so as to control the flow of the refrigerant flowing in the refrigerant fluid line 102.

In the present embodiment, the valve assembly 300 may be provided in a quantity of three, to be mounted on the first mounting groove 112 of the first body 110, the second mounting groove 122 of the second body 120, and the third mounting groove 132 of the third body 130, respectively.

Here, as shown in FIG. 9 to FIG. 11, the valve assembly 300 may include an actuator 310, a shaft 320, a ball 330, and a seat housing 340.

First, the actuator 310 generates a torque. The actuator 310 may include a connector 312 on one side thereof to connect a signal line and/or a power line for the actuator 310 thereto.

In the present embodiment, the shaft 320 may have a first end coupled to the actuator 310 to receive power from the actuator 310.

In other words, the actuator 310 may rotate the shaft 320 in a forward or reverse direction according to a control signal transmitted thereto with the power supplied thereto.

In the present embodiment, the ball 330 may be coupled to a second end of the shaft 320. When the shaft 320 is rotated by the rotational power of the actuator 310, the ball 330 may rotate in the same direction as the shaft 320.

Here, the ball 330 may include an inlet passage 332 and an outlet passage 334.

The inlet passage 332 may selectively communicate the refrigerant fluid line 102. The refrigerant may flow into the inlet passage 332.

The outlet passage 334 may communicate the inlet passage 332. The refrigerant introduced into the inlet passage 332 may be discharged to the outlet passage 334.

In other words, the refrigerant introduced into the valve manifold 100 through the eighth refrigerant hole 168 or the ninth refrigerant hole 169 may be discharged to the outlet passage 334 via the inlet passage 332.

In more detail, when the ball 330 is rotated in a forward direction or reverse direction by an operation of the actuator 310, the refrigerant may be discharged through the outlet passage 334, through a single one or plural ones among the third refrigerant hole 163, the fourth refrigerant hole 164, the fifth refrigerant hole 165, the sixth refrigerant hole 166, or the seventh refrigerant hole 167.

In addition, the seat housing 340 may rotatably accommodate the ball 330. The seat housing 340 may be coupled to the actuator 310.

Here, the seat housing 340 may be formed to have a diameter that gradually decreases toward the valve manifold 100 from the actuator 310.

Accordingly, when mounting the valve assembly 300 on the first mounting groove 112, or the second mounting groove 122, or the third mounting groove 132, the seat housing 340 may be smoothly inserted into the first mounting groove 112, or the second mounting groove 122, or the third mounting groove 132.

In another embodiment, a sealing member 400 may be interposed between the valve manifold 100 and the valve assembly 300.

The sealing member 400 is capable of preventing the refrigerant from leaking between the valve manifold 100 and the valve assembly 300.

As shown in FIG. 9, in the ball 330 in the valve assembly 300 mounted on the third mounting groove 132, two outlets passage 334 communicating with the inlet passage 332 may be formed at both sides of the inlet passage 332.

Therefore, if the refrigerant valve module 10 for the vehicle according to the embodiment of the present disclosure is applied as described above, the refrigerant valve module 10 is simple to assemble with a reduced number of parts, and is easy to maintain, by integrally forming the plurality of valve assemblies 300 using the valve manifold 100.

In addition, according to the present disclosure, by mounting the plurality of valve assemblies 300 using the valve manifold 100 and including the refrigerant flow path 102 inside, it is possible to prevent a leakage of the refrigerant while minimizing the sealing member 400, thereby improving overall marketability.

In addition, according to the present disclosure, since the refrigerant flow path 102 formed in the valve manifold 100 is not sharply bent, it is possible to reduce a passage resistance, and it is possible to minimize the use of connecting pipes.

Furthermore, according to the present disclosure, by promoting simplification and modularization of components, it is possible to reduce the manufacturing cost and reduce the weight, and it is possible to improve the space utilization.

While this present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the appended claims.

DESCRIPTION OF SYMBOLS

10: the refrigerant valve module
100: valve manifold
102: the refrigerant fluid line
110, 120, 130: first, second, and third body
112, 122, 132: first, second, and third mounting groove
114, 124, 134: first, second, and third fluid line
140, 150: first and second connection portion
142, 152: first and second connection fluid line
161, 162, 163: first, second, and third refrigerant hole
164, 165, 166: fourth, fifth, and sixth refrigerant hole
167, 168, 169: seventh, eighth, and ninth refrigerant holes
300: valve assembly
310: actuator
320: shaft
330: ball
332: inlet passage
334: outlet passage
340: seat housing
400: sealing member

What is claimed is:

1. A refrigerant valve module for a vehicle, the refrigerant valve module comprising:

a valve manifold interiorly forming a refrigerant fluid line and configured to selectively discharge or bypass a supplied refrigerant; and a plurality of valve assemblies mounted in the valve manifold and configured to control a flow of the refrigerant flowing in the refrigerant fluid line, wherein the valve manifold comprises:

a first body inside which a first fluid line is formed;

a first mounting groove communicating with the first fluid line, and formed in the first body to be capable of mounting a first valve assembly among the plurality of valve assemblies;

a second body inside which a second fluid line is formed;

a second mounting groove communicating with the second fluid line, and formed in the second body to be capable of mounting a second valve assembly among the plurality of valve assemblies;

a third body inside which a third fluid line is formed;

a third mounting groove communicating with the third fluid line, and formed in the third body to be capable of mounting a third valve assembly among the plurality of valve assemblies;

a first connection portion interiorly forming a first connection fluid line, and disposed between the first body and the second body to interconnect the first body and the second body;

a second connection portion interiorly forming a second connection fluid line, and disposed between the first body and the third body to interconnect the first body and the third body; and a plurality of refrigerant holes communicating with the first mounting groove, the second mounting groove or the third mounting groove, and wherein the plurality of refrigerant holes is formed in the first body, the second body, the third body, the first connection portion, and the second connection portion, respectively, such that refrigerant is introduced or discharged through the plurality of refrigerant holes, and wherein the plurality of refrigerant holes comprises:

a first refrigerant hole communicating with the first mounting groove through the first fluid line, and horizontally formed toward the second body based on a length direction of the valve manifold;

a second refrigerant hole communicating with the first mounting groove through the first fluid line, and horizontally formed toward the third body based on the length direction of the valve manifold; and a third refrigerant hole communicating with the first mounting groove through the first fluid line, and formed perpendicular to the first and the second refrigerant hole in an opposite direction of the first mounting groove.

2. The refrigerant valve module of claim 1, wherein the refrigerant fluid line comprises the first fluid line, the second fluid line, the third fluid line, the first connection fluid line, and the second connection fluid line, and wherein the first fluid line, the second fluid line, the third fluid line, the first connection fluid line, and the second connection fluid line are interconnected within the first body, the second body, the third body, the first connection portion, and the second connection portion, respectively.

3. The refrigerant valve module of claim 1, wherein the plurality of refrigerant holes further comprises:

a fourth refrigerant hole communicating with the second mounting groove through the second fluid line, and formed in the second body and perpendicular to the first refrigerant hole; and a fifth refrigerant hole formed in the second body to be disposed on the same axis as the fourth refrigerant hole, and communicating with the second mounting groove through the second fluid line.

4. The refrigerant valve module of claim 3, wherein the plurality of refrigerant holes further comprises:

a sixth refrigerant hole communicating with the third mounting groove through the third fluid line, and formed in the third body and perpendicular to the second refrigerant hole;

a seventh refrigerant hole formed in the third body to be disposed on the same axis as the sixth refrigerant hole, and communicating with the third mounting groove through the third fluid line;

an eighth refrigerant hole communicating with the first connection fluid line, and formed in the first connection portion in the same direction as the fourth refrigerant hole; and a ninth refrigerant hole communicating with the second connection fluid line, and formed in the second connection portion in the same direction as the sixth refrigerant hole.

5. The refrigerant valve module of claim 4, wherein the refrigerant supplied to the valve manifold is selectively discharged to the third refrigerant hole, the fourth refrigerant hole, the fifth refrigerant hole, the sixth refrigerant hole, or the seventh refrigerant hole.

6. The refrigerant valve module of claim 4, wherein the refrigerant supplied to the valve manifold selectively flows into the eighth refrigerant hole or the ninth refrigerant hole.

7. The refrigerant valve module of claim 1, wherein the first body, the second body, the third body, the first connection portion, and the second connection portion are integrally formed.

8. The refrigerant valve module of claim 1, wherein each of the plurality of valve assemblies comprises:

an actuator configured to generate a torque by being applied with a control signal;

a shaft having a first end coupled to the actuator to receive power from the actuator;

a ball coupled to a second end of the shaft, and rotating by the power of the actuator; and a seat housing coupled to the actuator and configured to rotatably accommodate the ball.

9. The refrigerant valve module of claim 8, wherein a diameter of the seat housing is gradually reduced from the actuator to the valve manifold.

10. The refrigerant valve module of claim 8, wherein the ball comprises:

an inlet passage selectively communicating with the refrigerant fluid line and configured to receive the refrigerant; and an outlet passage communicating with the inlet passage, and configured to discharge the refrigerant introduced into the inlet passage.

11. The refrigerant valve module of claim 1, wherein a sealing member is interposed between the valve manifold and the plurality of valve assemblies.

* * * * *